United States Patent
Frisbie et al.

(10) Patent No.: US 11,928,557 B2
(45) Date of Patent: Mar. 12, 2024

(54) SYSTEMS AND METHODS FOR ROUTING VEHICLES TO CAPTURE AND EVALUATE TARGETED SCENARIOS

(71) Applicant: Lyft, Inc., San Francisco, CA (US)

(72) Inventors: Kathryn Flaherty Frisbie, San Francisco, CA (US); Sen Xu, Mountain View, CA (US)

(73) Assignee: Lyft, Inc., San Francisco, CA (US)

( * ) Notice: Subject to any disclaimer, the term of this patent is extended or adjusted under 35 U.S.C. 154(b) by 1123 days.

(21) Appl. No.: 16/440,543

(22) Filed: Jun. 13, 2019

(65) Prior Publication Data

US 2020/0393841 A1    Dec. 17, 2020

(51) Int. Cl.
*G06N 20/00* (2019.01)
*G05D 1/00* (2006.01)
(Continued)

(52) U.S. Cl.
CPC ........... *G06N 20/00* (2019.01); *G05D 1/0221* (2013.01); *G06V 10/764* (2022.01); *G06V 20/56* (2022.01); *G05D 2201/0213* (2013.01)

(58) Field of Classification Search
CPC ........... G08G 1/0968; G08G 1/096888; G08G 1/164; G08G 1/166; G08G 1/167; G08G 1/202; G08G 1/207; G08G 1/16; G01C 21/34; G01C 21/36; G01C 21/00; G01C 21/12; G01C 21/14; G01C 21/26; G01C 21/28; G01C 21/30; G01C 21/3407; G01C 21/343; G01C 21/3461; G01C 21/3484; G01C 21/3492; G01C 21/3602; G01C 21/3647; G01C 21/3658; G01C 21/3691; G01C 21/3697; B60W 30/095;
(Continued)

(56) References Cited

U.S. PATENT DOCUMENTS

| | | | |
|---|---|---|---|
| 7,680,749 B1 | 3/2010 | Golding et al. | |
| 8,489,316 B1 | 7/2013 | Hedges | |

(Continued)

FOREIGN PATENT DOCUMENTS

| | | |
|---|---|---|
| EP | 3342683 | 7/2018 |
| JP | 2010134499 A | 6/2010 |

OTHER PUBLICATIONS

International Patent Application No. PCT/US2019/045780, Search Report and Written Opinion dated Nov. 27, 2019, 10 pages.

(Continued)

*Primary Examiner* — Anthony R Jimenez
(74) *Attorney, Agent, or Firm* — Sheppard Mullin Richter & Hampton LLP

(57) ABSTRACT

Systems, methods, and non-transitory computer-readable media can be configured to determine a targeted scenario and a mission associated with the targeted scenario. A route to a location associated with the mission can be determined based at least in part on a likelihood of encountering the targeted scenario, wherein the likelihood of encountering the targeted scenario is based at least in part on a frequency with which scenarios similar to the targeted scenario were encountered at the location. Whether the targeted scenario was encountered can be determined based on an evaluation of captured sensor data associated with the mission upon passing the location.

20 Claims, 10 Drawing Sheets

(51) Int. Cl.
*G05D 1/02* (2020.01)
*G06V 10/764* (2022.01)
*G06V 20/56* (2022.01)

(58) Field of Classification Search
CPC ....... B60W 30/18; B60W 10/20; B62D 15/00; B62D 15/02; G06V 20/00; G06V 20/56; G06V 10/76; G06V 10/764; G06N 3/00; G06N 20/00; G05D 1/00; G05D 1/02; G05D 1/021; G05D 1/0212; G05D 1/0221; G05D 1/0231; G05D 1/0246; G05D 1/0274; G05D 1/0276; G05D 1/0278; G05D 2201/00; G05D 2201/02; G05D 2201/0213
USPC .......................................................... 701/23
See application file for complete search history.

(56) References Cited

U.S. PATENT DOCUMENTS

| | | |
|---|---|---|
| 9,672,734 B1 | 6/2017 | Ratnasingam |
| 9,881,503 B1 | 1/2018 | Goldman |
| 10,186,156 B2 | 1/2019 | Sweeney |
| 10,338,594 B2 | 7/2019 | Long |
| 10,372,132 B2 | 8/2019 | Herz |
| 10,388,594 B2 | 8/2019 | Long |
| 10,414,395 B1 | 9/2019 | Sapp et al. |
| 10,992,755 B1 | 4/2021 | Tran |
| 11,126,180 B1 | 9/2021 | Kobilarov |
| 11,150,660 B1 | 10/2021 | Kabirzadeh et al. |
| 11,200,429 B1 | 12/2021 | Evans et al. |
| 11,409,304 B1 | 8/2022 | Cai et al. |
| 2003/0131069 A1 | 7/2003 | Lucovsky et al. |
| 2003/0131142 A1 | 7/2003 | Horvitz et al. |
| 2004/0210500 A1 | 10/2004 | Sobel et al. |
| 2005/0044108 A1 | 2/2005 | Shah et al. |
| 2005/0049993 A1 | 3/2005 | Nori et al. |
| 2005/0137769 A1 | 6/2005 | Takamatsu et al. |
| 2006/0036642 A1 | 2/2006 | Horvitz et al. |
| 2008/0071465 A1 | 3/2008 | Chapman et al. |
| 2008/0162498 A1 | 7/2008 | Omoigui |
| 2009/0177685 A1 | 7/2009 | Ellis et al. |
| 2009/0240728 A1 | 9/2009 | Shukla et al. |
| 2010/0017060 A1 | 1/2010 | Zhang |
| 2011/0251735 A1 | 10/2011 | Hayashi |
| 2012/0078595 A1 | 3/2012 | Balandin et al. |
| 2012/0078905 A1 | 3/2012 | Lin et al. |
| 2012/0191716 A1 | 7/2012 | Omoigui |
| 2012/0209505 A1 | 8/2012 | Breed et al. |
| 2012/0259732 A1* | 10/2012 | Sasankan ............... H04W 4/029 705/26.9 |
| 2012/0330540 A1 | 12/2012 | Ozaki et al. |
| 2013/0166205 A1 | 6/2013 | Ikeda et al. |
| 2013/0278442 A1 | 10/2013 | Rubin et al. |
| 2014/0032581 A1 | 1/2014 | Young |
| 2014/0257659 A1 | 9/2014 | Dariush |
| 2015/0269198 A1 | 9/2015 | Cornish et al. |
| 2015/0291146 A1 | 10/2015 | Prakah-Asante et al. |
| 2016/0061625 A1* | 3/2016 | Wang ................ G01C 21/3697 701/454 |
| 2016/0171521 A1 | 6/2016 | Ramirez |
| 2016/0223343 A1 | 8/2016 | Averbuch |
| 2016/0275730 A1 | 9/2016 | Bonhomme |
| 2016/0334797 A1 | 11/2016 | Ross |
| 2016/0357788 A1 | 12/2016 | Wilkes et al. |
| 2017/0010107 A1 | 1/2017 | Shashua |
| 2017/0017529 A1 | 1/2017 | Elvanoglu et al. |
| 2017/0089710 A1 | 3/2017 | Slusar |
| 2017/0113685 A1 | 4/2017 | Sendhoff |
| 2017/0132334 A1 | 5/2017 | Levinson et al. |
| 2017/0177937 A1 | 6/2017 | Harmsen |
| 2017/0200063 A1 | 7/2017 | Nariyambut Murali et al. |
| 2017/0241791 A1 | 8/2017 | Madigan |
| 2017/0270372 A1 | 9/2017 | Stein |
| 2017/0286782 A1 | 10/2017 | Pillai et al. |
| 2017/0293763 A1 | 10/2017 | Shear et al. |
| 2018/0005254 A1 | 1/2018 | Bai et al. |
| 2018/0023964 A1 | 1/2018 | Ivanov |
| 2018/0181095 A1 | 3/2018 | Funk |
| 2018/0136979 A1 | 5/2018 | Morris |
| 2018/0137373 A1 | 5/2018 | Rasusson |
| 2018/0149491 A1 | 5/2018 | Tayama |
| 2018/0217600 A1 | 8/2018 | Shashua et al. |
| 2018/0246752 A1 | 8/2018 | Bonetta et al. |
| 2018/0288060 A1 | 10/2018 | Jackson et al. |
| 2018/0316695 A1 | 11/2018 | Esman |
| 2019/0019329 A1 | 1/2019 | Eyler et al. |
| 2019/0042867 A1 | 2/2019 | Chen et al. |
| 2019/0049948 A1 | 2/2019 | Patel et al. |
| 2019/0049968 A1 | 2/2019 | Dean |
| 2019/0108753 A1 | 4/2019 | Kaiser et al. |
| 2019/0143992 A1 | 5/2019 | Sohn et al. |
| 2019/0171797 A1 | 6/2019 | Morris |
| 2019/0174397 A1 | 6/2019 | Naqvi |
| 2019/0205310 A1 | 7/2019 | Satkunarajah et al. |
| 2019/0243371 A1 | 8/2019 | Nister |
| 2019/0244040 A1 | 8/2019 | Hermann |
| 2019/0256087 A1 | 8/2019 | Kim et al. |
| 2019/0258251 A1 | 8/2019 | Ditty |
| 2019/0258878 A1 | 8/2019 | Koivisto |
| 2019/0266129 A1 | 8/2019 | Kumarasamy et al. |
| 2019/0370615 A1 | 12/2019 | Murphy et al. |
| 2019/0377354 A1 | 12/2019 | Shalev-Shwartz et al. |
| 2020/0013088 A1 | 1/2020 | Naqvi |
| 2020/0019161 A1 | 1/2020 | Stenneth |
| 2020/0042626 A1 | 2/2020 | Curtis et al. |
| 2020/0042651 A1 | 2/2020 | Curtis et al. |
| 2020/0050190 A1 | 2/2020 | Patel et al. |
| 2020/0050483 A1 | 2/2020 | Shear et al. |
| 2020/0081445 A1 | 3/2020 | Stetson et al. |
| 2020/0117200 A1 | 4/2020 | Akella et al. |
| 2020/0151353 A1 | 5/2020 | Struttmann |
| 2020/0180610 A1 | 6/2020 | Schneider et al. |
| 2020/0183794 A1 | 6/2020 | Dwarampudi et al. |
| 2020/0201890 A1 | 6/2020 | Viswanathan |
| 2020/0204534 A1 | 6/2020 | Beecham et al. |
| 2020/0285788 A1 | 9/2020 | Brebner |
| 2020/0351322 A1 | 11/2020 | Magzimof et al. |
| 2020/0394455 A1 | 12/2020 | Lee et al. |
| 2021/0011150 A1 | 1/2021 | Bialer et al. |
| 2021/0021539 A1 | 1/2021 | Shear et al. |
| 2021/0041873 A1 | 2/2021 | Kim et al. |
| 2021/0053561 A1 | 2/2021 | Beller et al. |
| 2021/0055732 A1 | 2/2021 | Caldwell et al. |
| 2021/0097148 A1 | 4/2021 | Bagschik et al. |
| 2021/0142526 A1 | 5/2021 | Mantyjarvi et al. |
| 2021/0350147 A1 | 11/2021 | Yuan et al. |
| 2022/0011130 A1 | 1/2022 | Hanniel et al. |
| 2022/0113371 A1 | 4/2022 | Han et al. |
| 2022/0163348 A1 | 5/2022 | Zhang et al. |

OTHER PUBLICATIONS

International Patent Application No. PCT/US2020/039444, Search Report and Written Opinion dated Oct. 13, 2020, 10 pages.

* cited by examiner

SYSTEMS AND METHODS FOR ROUTING VEHICLES TO CAPTURE AND EVALUATE TARGETED SCENARIOS

FIELD OF THE INVENTION

The present technology relates to navigation systems. More particularly, the present technology relates to systems, apparatus, and methods for routing vehicles to capture and evaluate targeted scenarios.

BACKGROUND

Vehicles are increasingly being equipped with intelligent features that allow them to monitor their surroundings and make informed decisions on how to navigate. Such vehicles, whether autonomously or semi-autonomously driven, may be capable of sensing their environment and navigating with little or no human input. A vehicle may include a variety of systems and subsystems for enabling the vehicle to determine its surroundings so that it may safely navigate to target destinations. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have one or more sensors that can recognize hazards, roads, lane markings, traffic signals, etc. Data from the sensors may be used, for example, to safely navigate the vehicle, activate certain safety features (e.g., automatic braking), and generate alerts about potential hazards.

SUMMARY

Various embodiments of the present technology can include systems, methods, and non-transitory computer readable media configured to determine a targeted scenario and a mission associated with the targeted scenario. A route to a location associated with the mission can be determined based at least in part on a likelihood of encountering the targeted scenario, wherein the likelihood of encountering the targeted scenario is based at least in part on a frequency with which scenarios similar to the targeted scenario were encountered at the location. Whether the targeted scenario was encountered can be determined based on an evaluation of captured sensor data associated with the mission upon passing the location.

In an embodiment, the targeted scenario comprises a set of features associated with the targeted scenario and wherein the set of features corresponds with one or more objects associated with the targeted scenario.

In an embodiment, the targeted scenario is based at least in part on a past scenario and the set of features associated with the targeted scenario is based at least in part on sensor data associated with the past scenario.

In an embodiment, the targeted scenario is based at least in part on user specified features to be included in the targeted scenario and the set of features associated with the targeted scenario is based at least in part on sensor data associated with the user specified features.

In an embodiment, the likelihood of encountering the targeted scenario is further based at least in part on a history of sensor data captured from a location, wherein the history of sensor data is associated with scenarios that were encountered at the location.

In an embodiment, the evaluation of the captured sensor data is based at least in part on a machine learning model, and the machine learning model is trained to determine whether a first set of images associated with the captured sensor data correspond with a second set of images associated with the targeted scenario.

In an embodiment, the evaluation of the captured sensor data is based at least in part on a machine learning model, and the machine learning model is trained to determine whether a first set of images associated with the captured sensor data correspond with a second set of images associated with the targeted scenario.

In an embodiment, the mission to encounter the targeted scenario is one of a set of missions ranked based at least in part on a respective likelihood of encountering a respective targeted scenario.

In an embodiment, the set of missions are ranked further based at least in part on at least one of: a distance, a cost, an availability, or a proximity to other targeted scenarios associated with each respective targeted scenario.

In an embodiment, a new route associated with the mission can be determined based at least in part on a determination that the targeted scenario was not encountered.

It should be appreciated that many other features, applications, embodiments, and variations of the present technology will be apparent from the accompanying drawings and from the following detailed description. Additional and alternative implementations of the structures, systems, non-transitory computer readable media, and methods described herein can be employed without departing from the principles of the present technology.

Figure 1A:
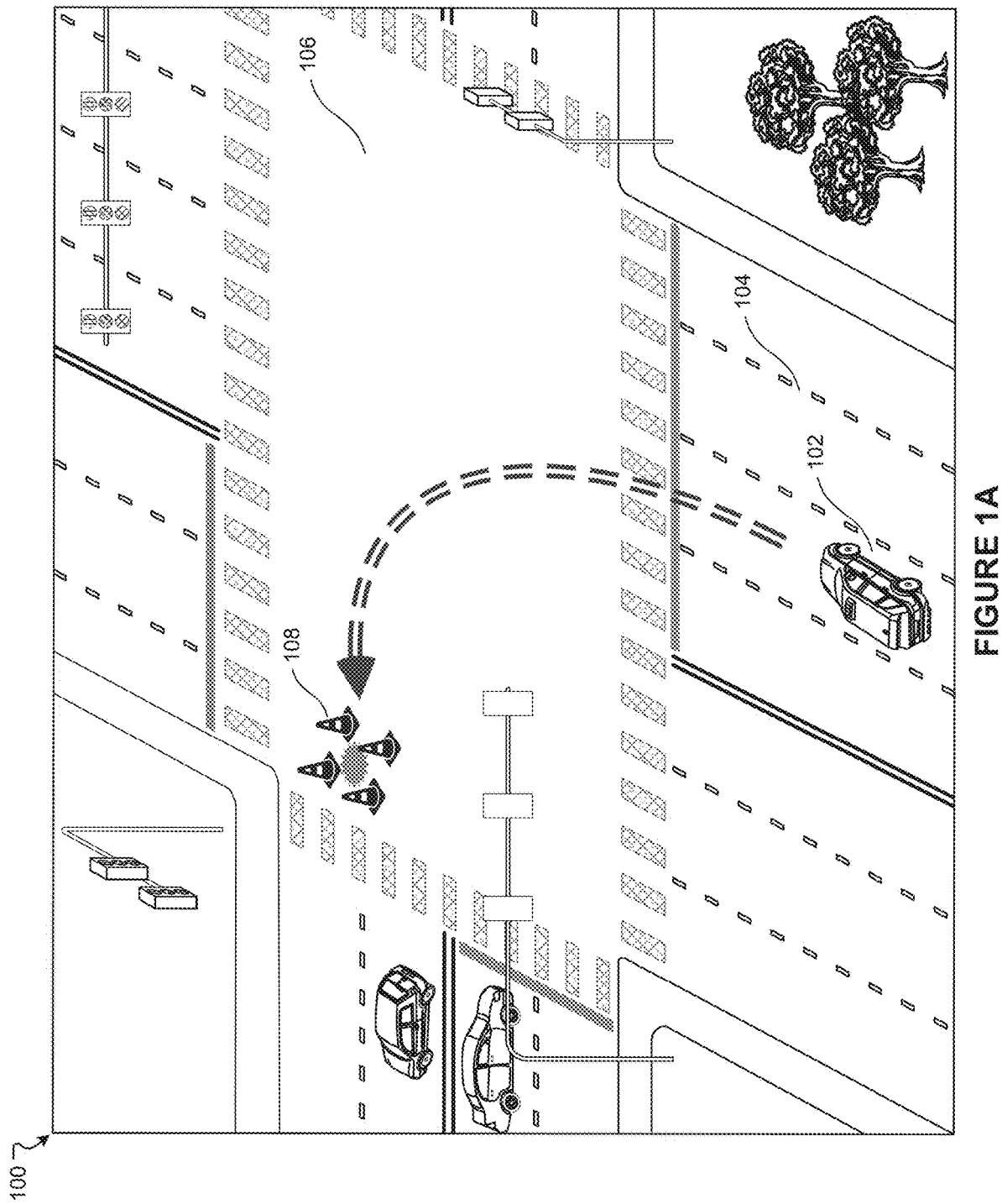
FIGS. 1A-1B illustrate example scenarios that demonstrate various challenges encountered by conventional approaches when testing vehicle responses to scenarios, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Vehicles are increasingly being equipped with intelligent features that allow them to monitor their surroundings and make informed decisions on how to navigate. Such vehicles, whether autonomously or semi-autonomously driven, may be capable of sensing their environment and navigating with little or no human input. A vehicle may include a variety of systems and subsystems for enabling the vehicle to determine its surroundings so that it may safely navigate to target destinations. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have one or more sensors that can recognize hazards, roads, lane markings, traffic signals, etc. Data from the sensors may be used, for example, to safely navigate the vehicle, activate certain safety features (e.g., automatic braking), and generate alerts about potential hazards. A transportation management system may comprise a fleet of such vehicles. Each vehicle in the fleet may include one or more sensors in a sensor suite. In general, a vehicle can traverse a geographic location or region using a number of different routes. Each route can be made up of one or more road segments. Further, each road segment can be associated with a number of scenarios that may be encountered by vehicles while driving on those road segments. For instance, a road segment in a mountainous terrain may be associated with a "fallen debris" scenario. In another example, a road segment near a school may be associated with a "school-children" scenario. Such scenarios can be taken into consideration when routing vehicles to reduce risk and improve safety, for example, by modifying operation of the vehicles when navigating high risk road segments (e.g., reducing speed, increasing distance between objects, etc.). Thus, vehicles can be trained to respond appropriately to various types of scenarios that are encountered by the vehicle. However, evaluating a vehicle's response to a particular scenario can be challenging because the vehicle typically needs to encounter the particular scenario in a real-world setting, determine that the particular scenario was indeed encountered based on sensor data, and then collect various data that can be used to evaluate the vehicle's response to the particular scenario. Given that some scenarios occur less frequently than others, testing vehicle responses to scenarios in a real-world setting can be difficult and time consuming.

For example, FIG. 1A illustrates an example scenario 100 in which a vehicle 102 is navigating a road 104. In the example scenario 100, the vehicle 102 is attempting to make a left turn at an intersection 106 while navigating to a target destination. When the vehicle 102 makes the left turn at the intersection 106, the vehicle 102 encounters a construction hazard 108. In the example scenario 100, the vehicle 102 may fail to appropriately evaluate and respond to the construction hazard 108, for example, by safely navigating around the construction hazard 108. Based on the failure of the vehicle 102 to appropriately evaluate and respond to the scenario 100 involving the construction hazard 108, one or more computing systems for autonomously or semi-autonomously navigating the vehicle 102 can be updated to appropriately detect and respond to scenarios similar to the scenario 100 involving the construction hazard 108. For example, one or more software updates to computing systems that control operation of vehicles can allow the computing systems to detect and respond to such scenarios. Such software updates are typically tested in real-world settings before they can be put into production to ensure the updates are working as intended. However, testing such software updates can be challenging because a vehicle that is tasked with testing the software updates must typically encounter a scenario that is the same or similar to the scenario 100 involving the construction hazard 108 in a real-world setting and then test the vehicle's response to the scenario. It can be very difficult to find scenarios that recreate the exact scenario encountered due to the dynamic and changing nature of agents and objects that the vehicle may encounter. For instance, although the construction hazard 108 may exist, it can be difficult to recreate the exact approach, view, and conditions that led to the particular failure of the computing systems. For example, under conventional approaches, a human driver may be tasked with locating the scenario to be tested and then navigating the vehicle 102 to those locations to test its responses to the scenario. However, the human driver may fail to locate the same or similar scenario. Similarly, human drivers may attempt to come across a particular scenario by chance and hope that the conditions line up exactly with the scenario that they are hoping to capture. However, it may take many passes by the construction hazard 108 to have similar conditions present (e.g., a turn signal approached from a similar location, no pedestrians in the cross-walk, no vehicles in front of the vehicle blocking the view of the construction hazard, etc.). Accordingly, the human driver may fail to encounter an appropriate scenario to test the update for the vehicle 102, and the update cannot be confirmed to be working without many passes past the location, if ever. This is particularly true of scenarios that involve dynamic agents and objects as it is difficult to recreate the location, placement, and conditions associated with such dynamic agents (particularly rare or less frequently observed types of agents).

Figure 1B:
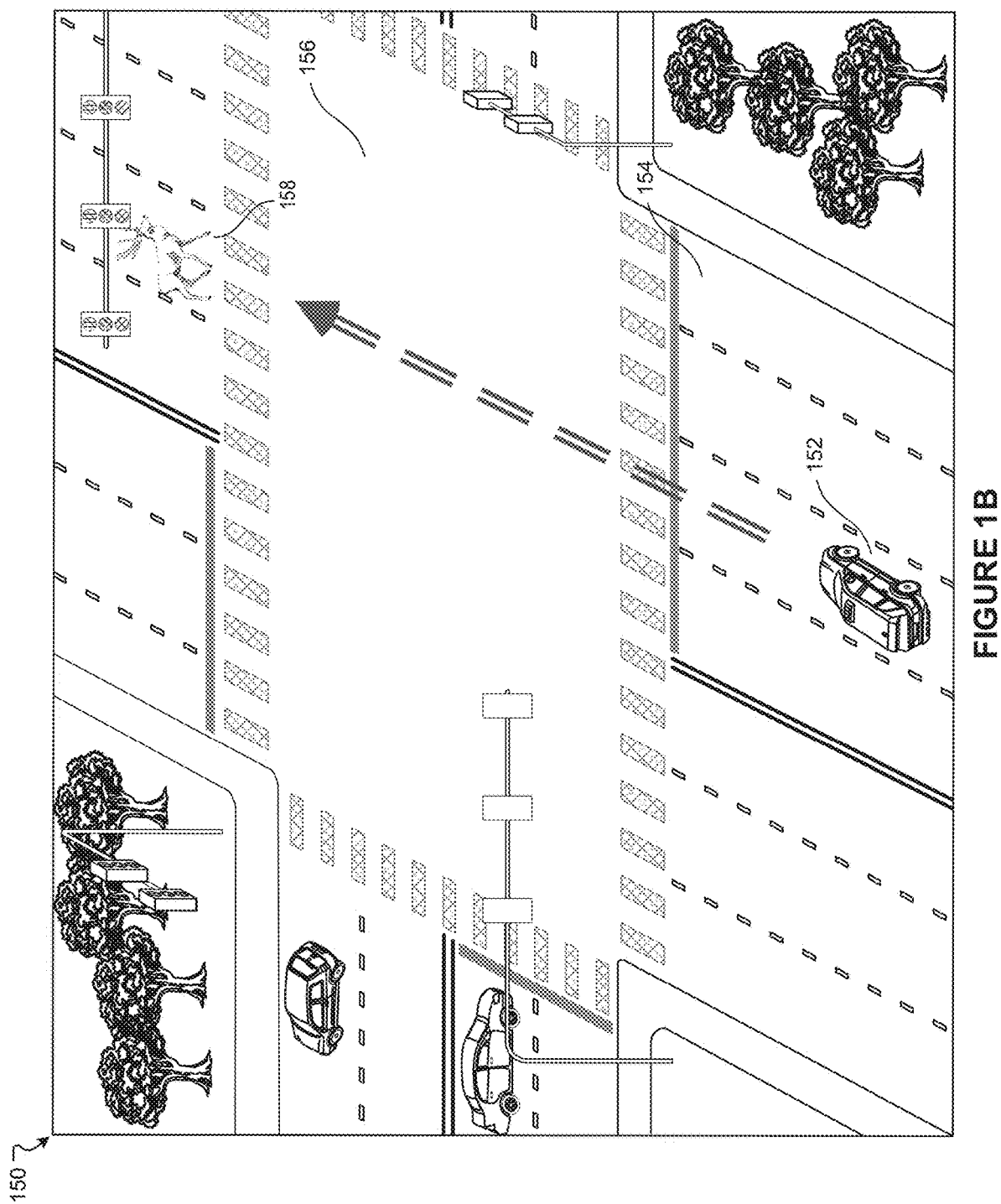

For instance, FIG. 1B illustrates an example scenario 150 in which a vehicle 152 is navigating a road 154. In the example scenario 150, the vehicle 152 is navigating straight through an intersection 156. As the vehicle 152 navigates through the intersection 156, the vehicle encounters a deer 158. In the example scenario 150, the vehicle may fail to appropriately evaluate and respond to the deer 158 by safely navigating around the deer 158 and a safety operator or driver may take over control of the vehicle. Based on the failure of the vehicle 152 to appropriately evaluate and respond to the scenario 150 involving the deer 158, one or more computing systems for autonomously or semi-autonomously navigating the vehicle 152 can be updated to appropriately detect and respond to scenarios similar to the scenario involving the deer 158. However, conventional approaches for testing such rare scenarios typically rely on humans to locate the scenarios in real-world settings so that vehicle responses to the scenarios can be tested and evaluated. For example, a human driver may operate the vehicle 152 and attempt to locate a deer to test whether the vehicle 152 can appropriately respond. The human driver may not know where to locate a deer and may drive aimlessly without ever encountering one. Accordingly, the human driver may fail to encounter such rare or infrequent scenarios to test an updated computing system on the vehicle 152. As demonstrated in the examples above, conventional approaches to encountering targeted scenarios can provide significant challenges in terms of efficiency and efficacy. These challenges can be exacerbated when a targeted scenario involves a combination of static, semi-static, and dynamic objects. Thus, conventional approaches are not efficient or effective in addressing these challenges.

An improved approach in accordance with the present technology overcomes the foregoing and other disadvantages associated with conventional approaches. The improved approach can overcome challenges associated with efficiently and effectively encountering a targeted scenario by determining a mission for a vehicle to complete, routing the vehicle to complete the mission leveraging the system's extensive data store of scenario data, and evaluating whether the vehicle has completed the mission. In general, a mission can be an objective for a vehicle to complete at one or more locations and, in some cases, can include one or more routes to the one or more locations. In various embodiments, a mission can be determined for a vehicle to complete. The mission can include a targeted scenario for the vehicle to encounter. The targeted scenario can involve static objects (e.g., traffic signs), semi-static objects (e.g., construction areas), dynamic objects (e.g., pedestrians), or a combination thereof. Additionally, the targeted scenario can involve environmental factors (e.g., geographic location, time of day, weather, location of the sun, glare, etc.) and physical factors (e.g., obstruction of view, angle of view to an object, relative position of a vehicle to an object, relative position of a vehicle to a road, etc.). For example, a targeted scenario can involve a vehicle traveling on the left lane of a four lane road, turning left at an intersection, and encountering a jaywalker in the intersection. The targeted scenario can also encountering the jaywalker at a particular angle and within a particular proximity. The targeted scenario can also involve a setting or rising sun causing glare. More examples of targeted scenarios are provided below. Based on the targeted scenario, the vehicle can be routed to a location where the vehicle is likely to encounter the targeted scenario. The location can be determined based on, for example, a history of sensor data captured at the location. The history of sensor data can reflect scenarios that have been encountered at the location over some period of time. A likelihood of encountering the targeted scenario at the location can be determined based on the scenarios that have been encountered at the location in the past. As the vehicle is routed to the location, the vehicle can capture sensor data. When the vehicle reaches the location and captures sensor data from the location, the sensor data can be evaluated to determine whether the vehicle encountered the targeted scenario. The evaluation of the sensor data can determine, for example, an object captured by the sensor data, a proximity of the object to the vehicle, and an angle of the object relative to the vehicle. More details relating to the evaluation of sensor data are provided below. If the vehicle encountered the targeted scenario, the vehicle can be routed to a next mission. If the vehicle fails to encounter the targeted scenario, the vehicle can be routed back to the location or to another location where the vehicle is likely to encounter the targeted scenario. In some cases, the mission may be provided to another vehicle to complete. For example, a vehicle can be provided with a mission to encounter a targeted scenario involving jaywalkers. The vehicle can be routed to a location where jaywalkers have frequently been encountered. Sensor data that the vehicle captures at the location can be evaluated to determine whether the vehicle has encountered the targeted scenario. In this example, evaluation of the sensor data can indicate that the vehicle has encountered the targeted scenario. If evaluation of the sensor data indicates that the vehicle failed to encounter the targeted scenario, then, depending on the embodiment, the vehicle may be routed back to the location to try to encounter the targeted scenario, the vehicle may be routed to another location to try to encounter the targeted scenario, or the mission may be provided to another vehicle. A determination of whether to route the vehicle back to the location, route the vehicle to another location, or to provide the mission to another vehicle can be based on, for example, a likelihood of encountering the targeted scenario at the location or another location and a proximity of the vehicle to the other location. More details relating to the routing of a vehicle are provided below. Many variations are possible. More details relating to the present technology are provided below.

Figure 2:
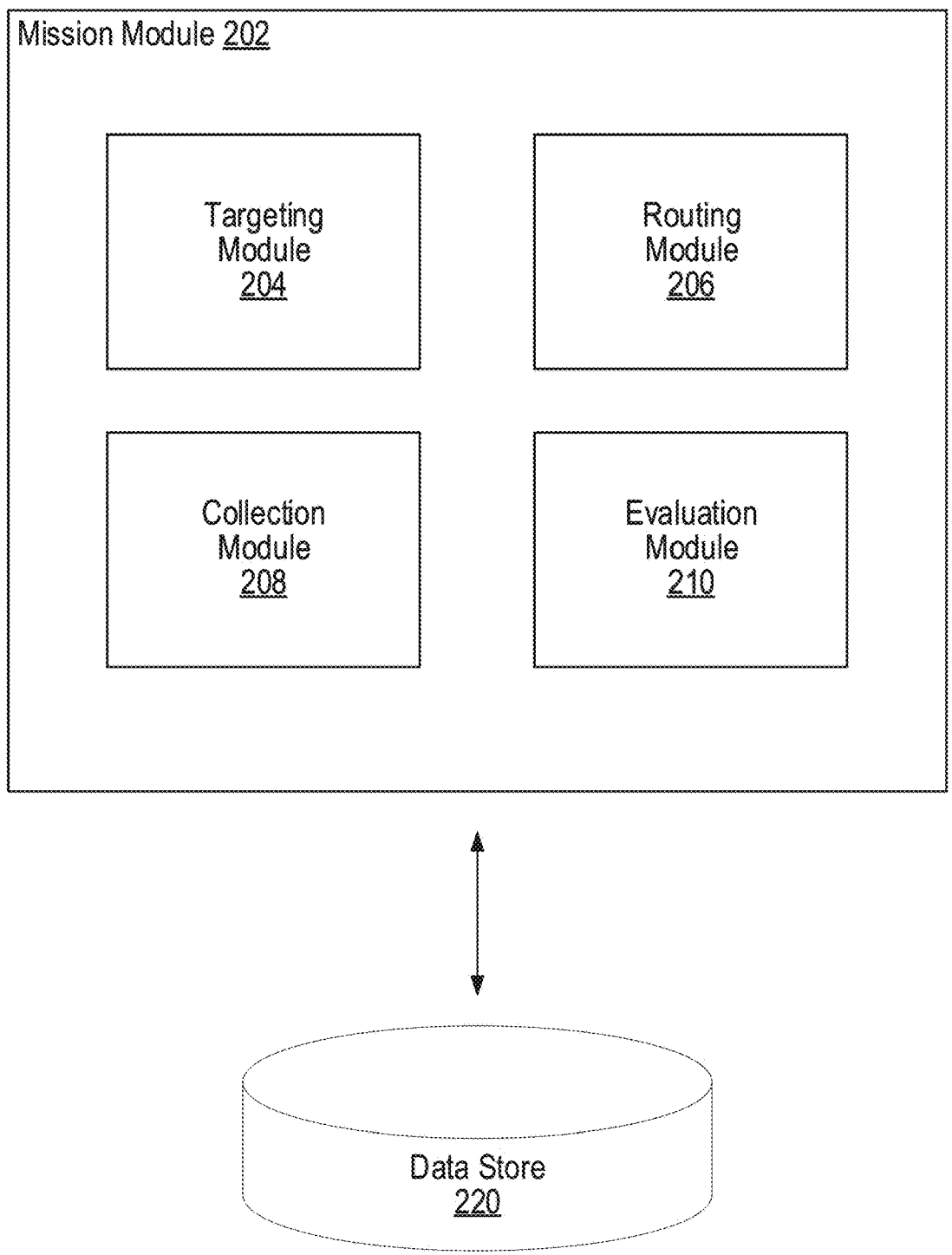
FIG. 2 illustrates an example system including a mission module, according to an embodiment of the present technology.

FIG. 2 illustrates an example system 200 including an example mission module 202, according to an embodiment of the present technology. As shown in the example of FIG. 2, the mission module 202 can include a targeting module 204, a routing module 206, a collection module 208, and an evaluation module 210. In some instances, the example system 200 can include at least one data store 220. The mission module 202 can be configured to communicate and operate with the at least one data store 220. The at least one data store 220 can be configured to store and maintain various types of data. In some embodiments, some or all of the functionality performed by the mission module 202 and its sub-modules may be performed by one or more backend computing systems, such as a transportation management system 660 of FIG. 6. In some embodiments, some or all of the functionality performed by the mission module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The targeting module 204 can be configured to determine a mission to encounter a targeted scenario. In general, a scenario can involve a combination of various features involving static objects (e.g., buildings, traffic signs, etc.), semi-static objects (e.g., construction areas, temporary signs, temporary structures, etc.), dynamic objects, such as agents (e.g., pedestrians, vehicles, cyclists, animals, etc.), or a combination thereof. Further, the features of a scenario can include various road types such as roads, road segments, cross walks, lanes, and intersections. The various road types can be associated with a vehicle or an object. Additionally, the features of a scenario can include various environmental and contextual features such as geographical location, time of day, and weather. Further, a set of features associated with a given scenario can be extracted from sensor data captured by one or more vehicles, such as the vehicle 640 of FIG. 6. For example, a set of features associated with a scenario can be determined from a combination of sensor data captured by vehicles including, for example, image data captured by optical cameras, point clouds captured by a LiDAR system, and radar data captured by a radar system, to name some examples. In some embodiments, the targeting module 204 can determine a set of features associated with a targeted scenario to be tested by a vehicle. In some embodiments, scenarios and their respective features can be pre-determined based on historical sensor data collected by a fleet of vehicles while navigating geographic regions. Information describing such scenarios and their respective features can be made accessible to the targeting module 204, for example, in a scenario information database. The information can also identify geographic locations at which various types of scenarios were encountered by the fleet of vehicles and a frequency with which the scenarios were encountered.

A set of features associated with a targeted scenario can be based on features of a past scenario that is similar to the targeted scenario. The features of the past scenario can be extracted from sensor data captured from an encounter with the past scenario. In some cases, sensor data can be captured from an encounter with a scenario where a vehicle failed to appropriately respond. Features of the scenario where the vehicle failed to appropriately respond can be extracted from the sensor data. Features of the scenario where the vehicle failed to appropriately respond can be utilized to determine a set of features associated with a targeted scenario. For example, a vehicle may encounter a scenario involving a jaywalker and a dog crossing a road together and capture sensor data from the encounter with the scenario. Features of the scenario can be extracted from the captured sensor data. In this example, the vehicle may fail to appropriately respond to the scenario. A software update to a computing system that controls operation of a vehicle may be developed to address this failure, and a mission can be determined to test the update. A set of features associated with a targeted scenario involving a jaywalker and a dog crossing a road together can be determined based on the features of the scenario where the vehicle failed to appropriately respond. In some embodiments, the targeting module 204 can determine a set of features associated with a targeted scenario based on known sensor data associated with specified features of the targeted scenario. In some cases, a user can specify features to be included in a targeted scenario, and the targeting module 204 can determine a set of features associated with the targeted scenario. The set of features can include features extracted from known sensor data associated with the specified features. For example, a targeted scenario can involve two jaywalkers and two dogs all crossing a road together. The road can be a four lane road, connected to a four way intersection. Additionally, the targeted scenario can involve a vehicle approaching the road by making a right turn at the four way intersection. A set of features associated with the targeted scenario can be determined based on a combination of features extracted from known sensor data associated with the jaywalker, features extracted from known sensor data associated with the dog, features extracted from known sensor data associated with the road, and features extracted from known sensor data associated with the intersection.

In some embodiments, the targeting module 204 can determine a mission that involves mapping a route. Mapping a route can involve capturing sensor data while navigating the route. The sensor data captured while navigating the route can be utilized to generate a map of the route. The targeting module 204 can determine a mission to maximize coverage of a map of a route. A mission for mapping a route can include lane-by-lane directions for navigating the route. The lane-by-lane directions for navigating the route can be based on maximizing coverage of the route. For example, a map of a route may be lacking coverage for a particular lane on the route. The targeting module 204 can determine a mission that includes directions to navigate the particular lane while mapping the route. In some embodiments, the targeting module 204 can determine a mission that involves a combination of mapping a route and encountering a targeted scenario. For example, the targeting module 204 can determine a mission that involves encountering a targeted scenario while navigating a route in a particular lane. The mission can include lane-by-lane directions for navigating the route while encountering the targeted scenario. By involving a combination of mapping routes and encountering targeted scenarios in a mission, the targeting module 204 can increase an efficiency of the mission. Many variations are possible.

The routing module 206 can be configured to route a vehicle to a geographic location based on criteria associated with a mission. For example, the mission criteria can instruct a vehicle to test a targeted scenario by navigating to the geographic location. The geographic location can be determined based on where the vehicle is likely to encounter the targeted scenario. In various embodiments, a likelihood of encountering a targeted scenario at a given location can be determined based on a history of sensor data captured by vehicles from the location. For example, the sensor data can be captured by a fleet of vehicles that offer ridesharing and other services over some period of time. The history of sensor data captured from the location can be analyzed to determine scenarios that were encountered at the location. In some embodiments, the scenarios can be categorized based on similarity. For example, the scenarios that were encountered at the location can be determined to be similar scenarios based on a similarity of features, such as objects, involved in the scenarios. Scenarios involving a higher number of similar features can be determined to be more similar to one another that scenarios involving a lower number of similar features. In some embodiments, scenarios can be determined to be similar when they involve a threshold number of similar features. In some embodiments, a likelihood of encountering a targeted scenario at a location can be determined based on a frequency with which scenarios similar to the targeted scenario were encountered. For example, a likelihood of encountering a targeted scenario can be higher at a location where scenarios similar to the targeted scenario were encountered at a higher frequency than at a location where scenarios similar to the targeted scenario were encountered at a lower frequency. For example, a targeted scenario to be tested can involve a cyclist and a jaywalker. In this example, a location where scenarios involving cyclists and scenarios involving jaywalkers were encountered at a high frequency can be determined to be a location where the targeted scenario is likely to be encountered. In some cases, a history of sensor data captured for a location can be used to determine days and times when various scenarios were encountered. Based on such information, a time period can be determined for when a targeted scenario is likely to be encountered at a location. In various embodiments, the routing module 206 can route a vehicle to a location based on a threshold likelihood of encountering a targeted scenario at the location. The likelihood can further be based on whether the vehicle is able to navigate to the location within a time period when the targeted scenario is likely to be encountered. For example, a targeted scenario can involve multiple cyclists. Based on a history of sensor data captured for a location, it can be determined that it is likely to encounter multiple cyclists at the location on Sundays between 6 pm and 8 pm in the evening. A vehicle on a mission to encounter the targeted scenario can be routed to the location on a Sunday between 6 pm and 8 pm, for example, to test the vehicle's response to the targeted scenario. In some embodiments, the routing module 206 can determine multiple locations where a vehicle is likely to encounter a targeted scenario. For example, the multiple locations can be ranked based on a respective likelihood of encountering the targeted scenario. A vehicle on a mission to encounter the targeted scenario can be initially be routed to a highest ranked location. If the vehicle fails to encounter the targeted scenario at the highest ranked location, the vehicle can be routed to a next highest ranked location or routed back to the same location for a second chance at encountering the targeted scenario. Many variations are possible.

In some embodiments, the routing module 206 can rank missions and determine a route for a vehicle to a geographical location based on the ranking of missions. Missions to encounter targeted scenarios can be ranked based on a respective priority associated with each targeted scenario. A mission to encounter a targeted scenario with a higher priority can be ranked higher than a mission to encounter a targeted scenario with a lower priority. A priority of a targeted scenario can be based on a rarity or difficulty associated with the targeted scenario. A targeted scenario that is more rare or difficult to encounter may have a higher priority than a targeted scenario that is more common or easy to encounter. In some embodiments, a priority of a targeted scenario can be manually assigned. Missions to encounter targeted scenarios can also be ranked based on distance, cost, and availability associated with the targeted scenarios. A mission to encounter a targeted scenario that has a shorter distance, has a lesser associated cost, or is less available can be ranked higher than a mission to encounter a targeted scenario that has a farther distance, has a higher associated cost, or is more available. A distance of a targeted scenario can be based on a distance between a vehicle and the targeted scenario. A cost associated with a targeted scenario can be based on a cost of navigating a vehicle to the targeted scenario. An availability of a targeted scenario can be based on a time span or a number of locations where the targeted scenario may be encountered. A targeted scenario that may be encountered at a greater number of locations within a longer span of time may be considered more available than a targeted scenario that may be encountered at a fewer number of locations within a shorter span of time. Missions to encounter targeted scenarios can also be ranked based on a proximity of the targeted scenarios to other targeted scenarios. A mission to encounter a targeted scenario that is within a shorter proximity to a greater number of other targeted scenarios can be ranked higher than a mission to encounter a targeted scenario that is within a larger proximity to a fewer number of other targeted scenarios. For example, a set of missions to encounter different targeted scenarios can be ranked based on a respective priority of each targeted scenario. The ranking of the set of missions can be adjusted based on distance, cost, availability, and proximity to other targeted scenarios. Based on the adjusted ranking of the set of missions, a highest ranked mission can be assigned to a vehicle, and a route for the vehicle can be determined. Many variations are possible.

The collection module 208 can be configured to access sensor data captured by vehicles. For example, the sensor data may include data captured by one or more sensors including optical cameras, LiDAR, radar, infrared cameras, and ultrasound equipment, to name some examples. The collection module 208 can obtain such sensor data, for example, from the data store 220 or directly from sensors associated with a vehicle in real-time (or near real-time). In some instances, the obtained sensor data may have been captured by a fleet of vehicles that offer ridesharing services including autonomous and semi-autonomous vehicles. In some embodiments, the collection module 208 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NAP) servers), or GPS data, to name some examples. More details describing the types of sensor data that may be obtained by the collection module 208 are provided below in connection with an array of sensors 644 of FIG. 6.

The collection module 208 can be configured to capture sensor data during a mission and extract features, such as objects, road types, and environmental factors, based on the captured sensor data. For example, a vehicle can capture sensor data while navigating a road segment. Based on the captured sensor data, it can be determined that the vehicle has encountered a scenario that involves, for example, a cyclist, a bike path, and raining weather. The collection module 208 can determine various contexts related to features extracted from the captured sensor data. The various contexts can describe various details about objects determined from the captured sensor data including, for example, a speed of an object, dimensions associated with the object, a direction of the object, and a location of the object. The various contexts can also describe various details about an object relative to a vehicle capturing sensor data. The various contexts can include, for example, a proximity of an object to a vehicle, a relative speed of the object to the vehicle, a direction of the object relative to the vehicle, and an angle of the object relative to the vehicle. For example, sensor data captured from a vehicle on a mission can be used to determine that the vehicle is encountering a scenario involving a cyclist. Based on the captured sensor data, the speed and direction of the cyclist can be determined. Additionally, based on the captured sensor data, a proximity of the cyclist to the vehicle and an angle of the cyclist relative to the vehicle can be determined. Many variations are possible.

The evaluation module 210 can be configured to evaluate sensor data captured by a vehicle on a mission and, based on the evaluation of the captured sensor data, determine whether the mission was completed. The captured sensor data can be evaluated based on one or more machine learning models. The one or more machine learning models can evaluate the captured sensor data with respect to sensor data associated with a targeted scenario. Based on the evaluation, the machine learning models can determine (or predict) whether the targeted scenario was encountered by the vehicle while completing the mission. In some embodiments, the evaluation module 210 can utilize an image classifier to evaluate captured sensor data to determine whether image data captured by a vehicle represents features that correspond to or match a set of features associated with a targeted scenario. The image classifier can train a machine learning model with a training set of images. Images with features associated with matching scenarios can be used as positive training data. Images with features that are not associated with matching scenarios can be used as negative training data. The machine learning model can be trained, using the training set of images, to identify whether images contain features associated with matching scenarios. Once trained, the machine learning model can be applied to images captured by a vehicle in real-time (or near real-time) to determine whether the images contain features matching a targeted scenario. For example, a targeted scenario can be associated with a set of features that represent a cyclist traveling along the right side of a vehicle. During a mission, a set of images captured by optical cameras of a vehicle can be analyzed based on the machine learning model to determine one or more scenarios that were encountered by the vehicle. If the one or more scenarios encountered by the vehicle correspond to the targeted scenario, then a determination can be made that the targeted scenario was encountered. In some embodiments, as an alternative to or in addition to utilizing the image classifier, as discussed above, the evaluation module 210 can utilize a physics model to evaluate captured sensor data to determine whether a targeted scenario was encountered by a vehicle. The physics model can train a machine learning model to identify objects based on sensor data. Such sensor data can be captured from, for example, LiDAR, radar, or sonar sensors and may enable, for example, a three-dimensional modelling of an environment. The machine learning model can be trained with a training set of sensor data and labeled objects identified from the sensor data. For example, a training set of sensor data can include a set of sensor data that are labeled to depict cyclists. A machine learning model can be trained, using a training set of sensor data and labeled objects, to determine objects based on sensor data. The trained machine learning model can be applied to captured sensor data and determine objects associated with the captured sensor data based on the captured sensor data. The trained machine learning model can also be applied to a collection of sensor data associated with a targeted scenario and determine objects associated with the targeted scenario based on the collection of sensor data. Based on the objects determined from the captured sensor data and objects determined from a collection of sensor data associated with a targeted scenario, it can be determined whether the objects associated with the captured sensor data correspond with the objects associated with the targeted scenario. Whether the targeted scenario was encountered can be determined based on whether the objects associated with the captured sensor data correspond with the objects associated with the targeted scenario. For example, a targeted scenario can involve a cyclist and a jaywalker crossing a road. Based on a collection of sensor data associated with the targeted scenario, objects associated with the targeted scenario can be determined. During a mission, a vehicle can encounter a scenario and capture sensor data associated with the scenario. Based on the captured sensor data, objects associated with the scenario can be determined. Based on an evaluation of the objects associated with the scenario and the objects associated with the targeted scenario, it can be determined whether the targeted scenario was encountered.

Figure 3A:
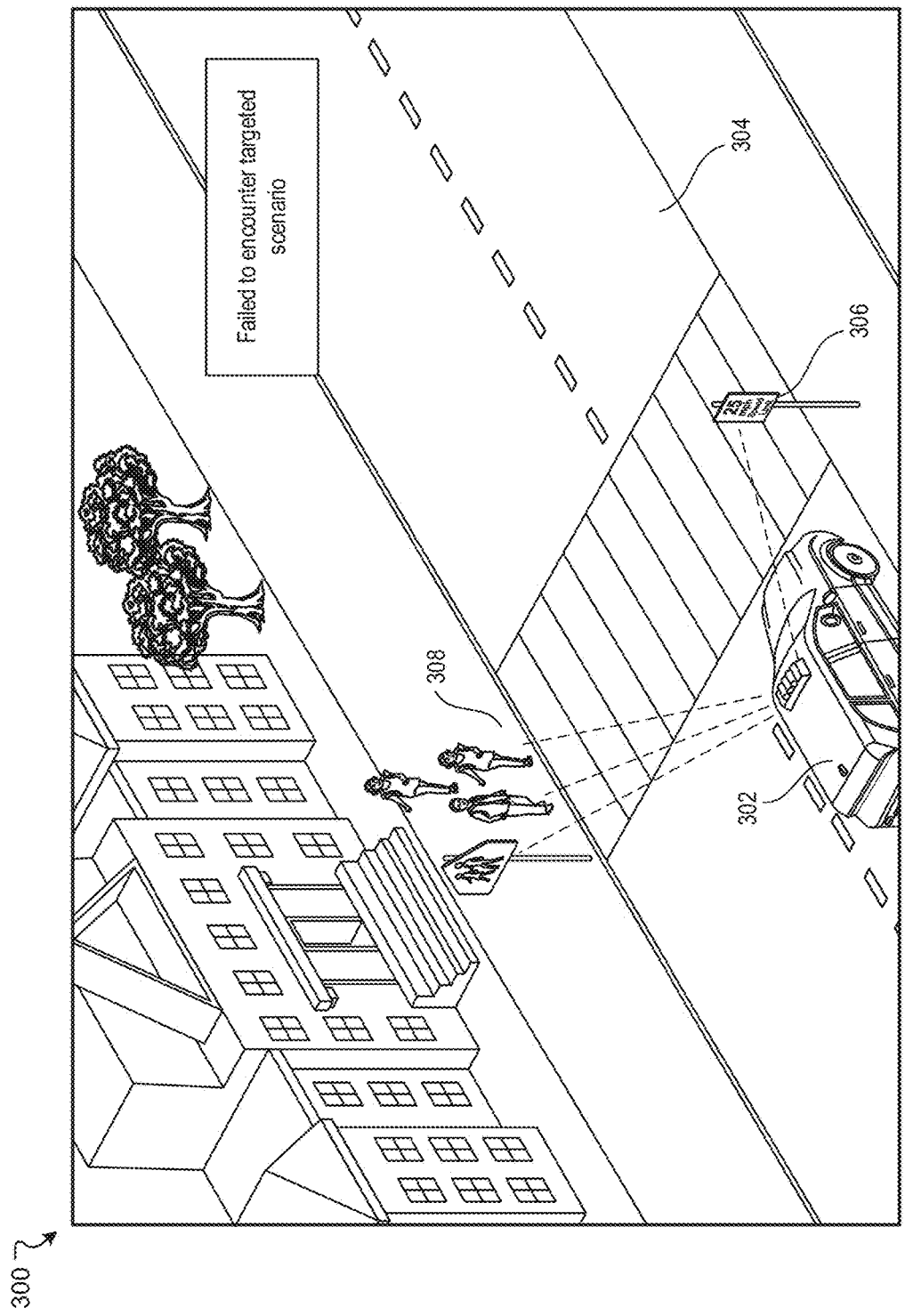
FIGS. 3A-3C illustrate example scenarios that may be experienced by a vehicle during the course of a mission, according to an embodiment of the present technology.
Figure 3B:
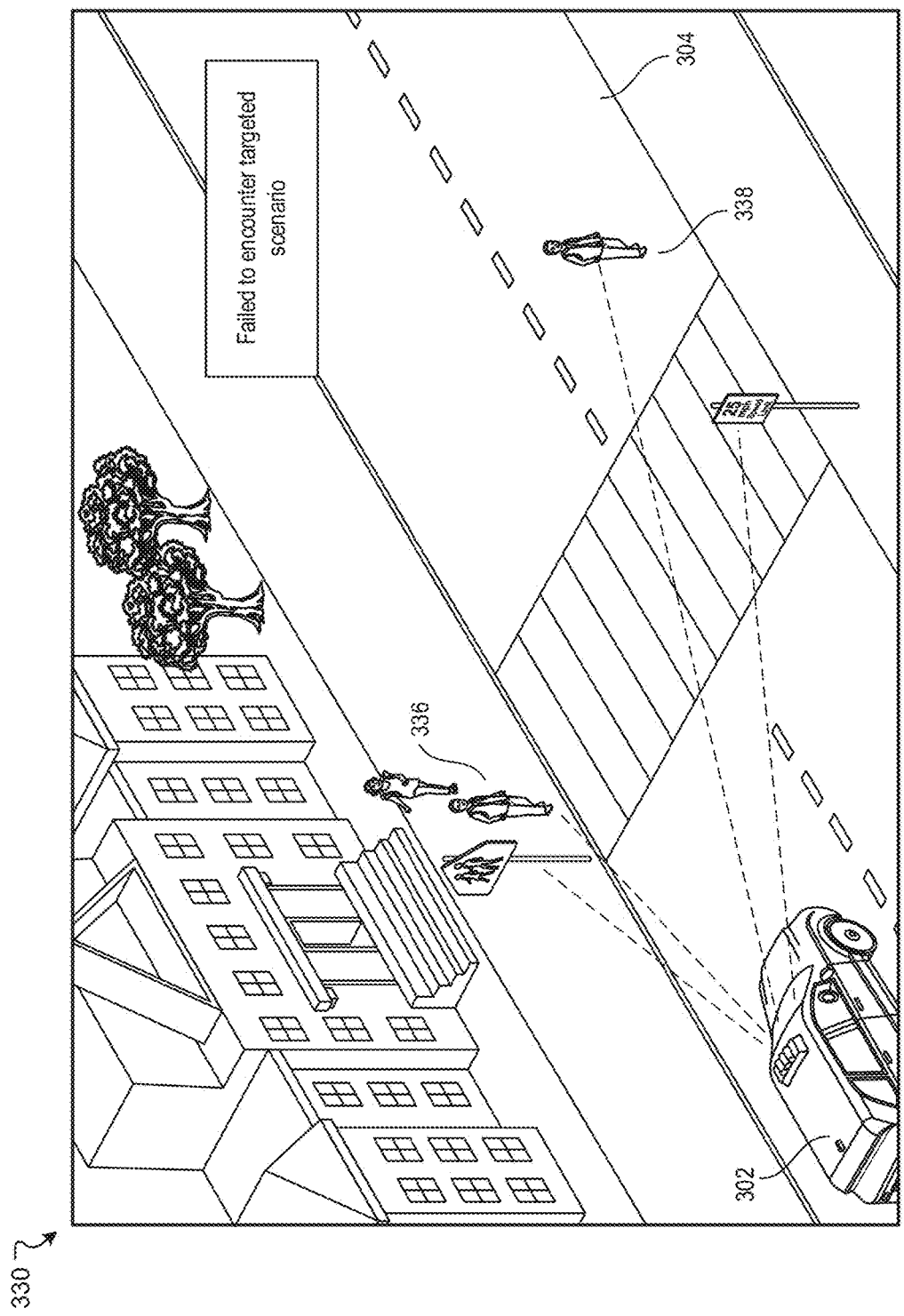
Figure 3C:
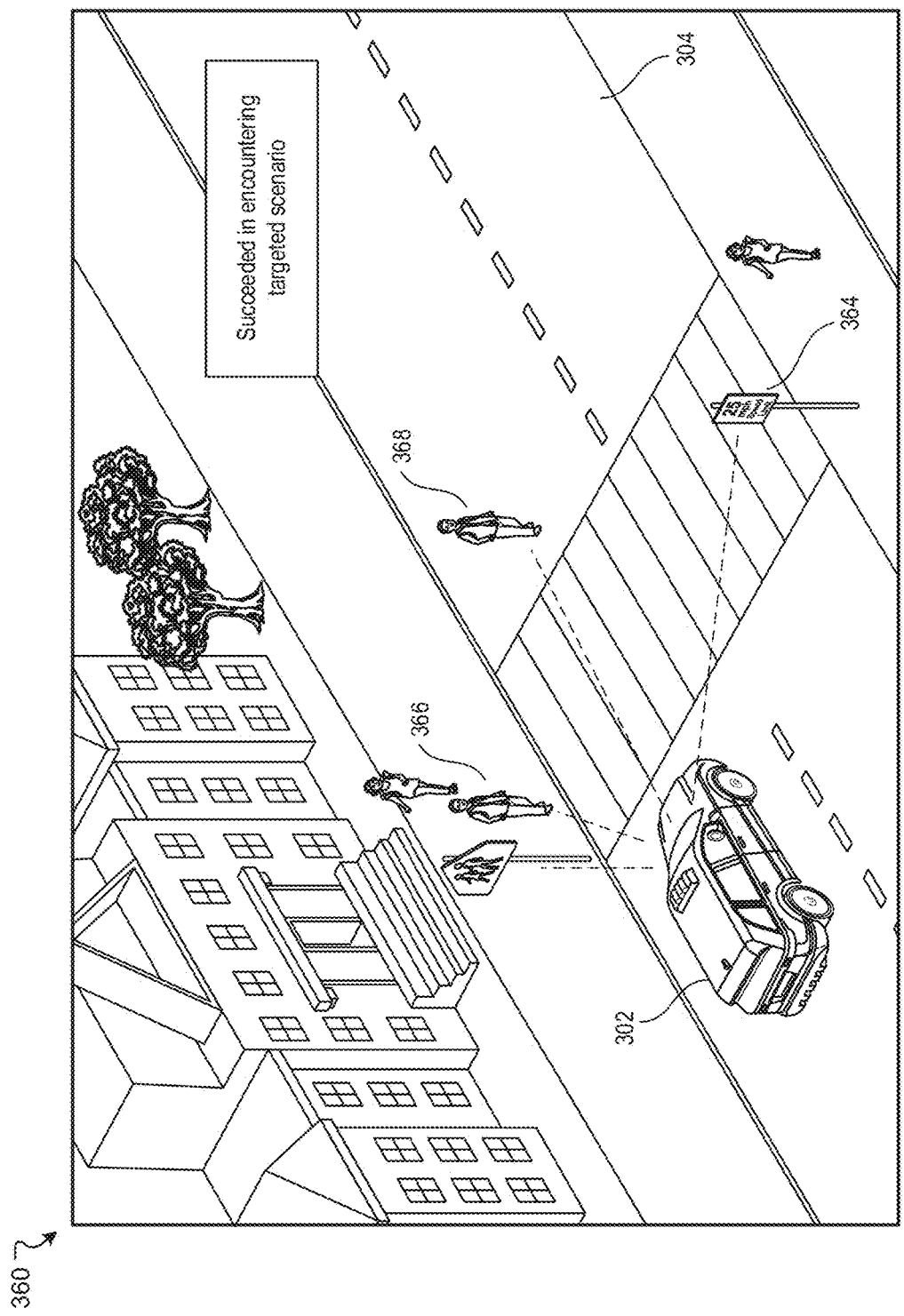

FIGS. 3A-3C illustrate example scenarios that may be experienced by a vehicle 302 while fulfilling a mission, according to an embodiment of the present technology. FIG. 3A illustrates an example scenario 300 where the vehicle 302 is on a mission to encounter a targeted scenario involving a jaywalker within a pre-defined proximity to the vehicle 302. Based on the targeted scenario, the vehicle 302 has been routed to a location 304 where the vehicle 302 is likely to encounter such a targeted scenario. As the vehicle 302 navigates through the location 304, the vehicle 302 can capture sensor data using a variety of sensors. The captured sensor data can reflect objects such as a traffic sign 306 and pedestrians 308. In this example, the captured sensor data can be evaluated and, based on the evaluation, the vehicle 302 can be determined to have not encountered a scenario involving a jaywalker within a pre-defined proximity of the vehicle 302. Accordingly, the vehicle 302 can be determined to have failed to encounter the targeted scenario. In this example, the vehicle 302 can be routed to return to the location 304 to attempt, again, to encounter a scenario involving a jaywalker within a pre-defined proximity. In other examples, the vehicle 302 can be routed elsewhere, or another vehicle can be routed to the location 304 to encounter the targeted scenario.

FIG. 3B illustrates an example scenario 330 where the vehicle 302 is continuing the mission to encounter a targeted scenario involving a jaywalker within a pre-defined proximity to the vehicle 302. In the example scenario 330, the vehicle 302 had previously failed to encounter the targeted scenario and has been routed back to the location 304 where it is likely for the vehicle 302 to encounter the targeted scenario. As the vehicle 302 is navigating through the location 304, the vehicle may be instructed to navigate in the right lane of the road. The instruction can be based on, for example, mapping the location while trying to encounter the targeted scenario. As the vehicle 302 navigates the location, the vehicle 302 captures sensor data. The captured sensor data can reflect objects, such as pedestrians 336 and a jaywalker 338. In the example scenario 330, the vehicle 302 encounters the jaywalker 338, but a determination is made based on the captured sensor data that the jaywalker 338 is not within a pre-defined proximity to the vehicle 302. Accordingly, based on an evaluation of the captured scenario data and the related ability to make precise determinations, the vehicle 302 can be determined to have not encountered the targeted scenario because the jaywalker 338 is not within the pre-defined proximity. Thus, the vehicle 302 has failed to encounter the targeted scenario. In this example, the vehicle 302 can be routed to return again to the location 304 to attempt, yet again, to encounter the targeted scenario. The example scenario 330 also illustrates an improvement of the present technology over conventional approaches. Under conventional approaches, a human driver with instructions to encounter a jaywalker may assume that jaywalker 338 would satisfy the instructions to encounter a jaywalker. However, as described above, the jaywalker 338 is not within the pre-defined proximity. Under conventional approaches, the human driver would not know that the targeted scenario was not encountered since the human driver may not be able to manually discern with required precision that the jaywalker 338 is not within the pre-defined proximity. Accordingly, an improvement of the present technology over conventional approaches allows a vehicle to determine in real-time (or near real-time) whether a targeted scenario was encountered based on sensor data captured by the vehicle.

FIG. 3C illustrates an example scenario 360 where the vehicle 302 is continuing the mission to encounter a targeted scenario involving a jaywalker within a threshold proximity to the vehicle 302. In the example scenario 360, the vehicle 302 has been routed back, again, to the location 304 where it is likely for the vehicle 362 to encounter a jaywalker. As the vehicle 302 is navigating through the location 304, the vehicle 302 continues to capture sensor data. The captured sensor data can reflect road types such as a crosswalk 364 and objects such as pedestrians 366 and a jaywalker 368. In the example scenario 360, the vehicle 302 encounters the jaywalker 368 within a pre-defined proximity to the vehicle 302. Based on an evaluation of the captured sensor data, the vehicle 302 can be determined to have encountered the targeted scenario involving a jaywalker within a pre-defined proximity. Thus, the vehicle 302 can be determined to have completed its mission to encounter the targeted scenario.

Figure 4:
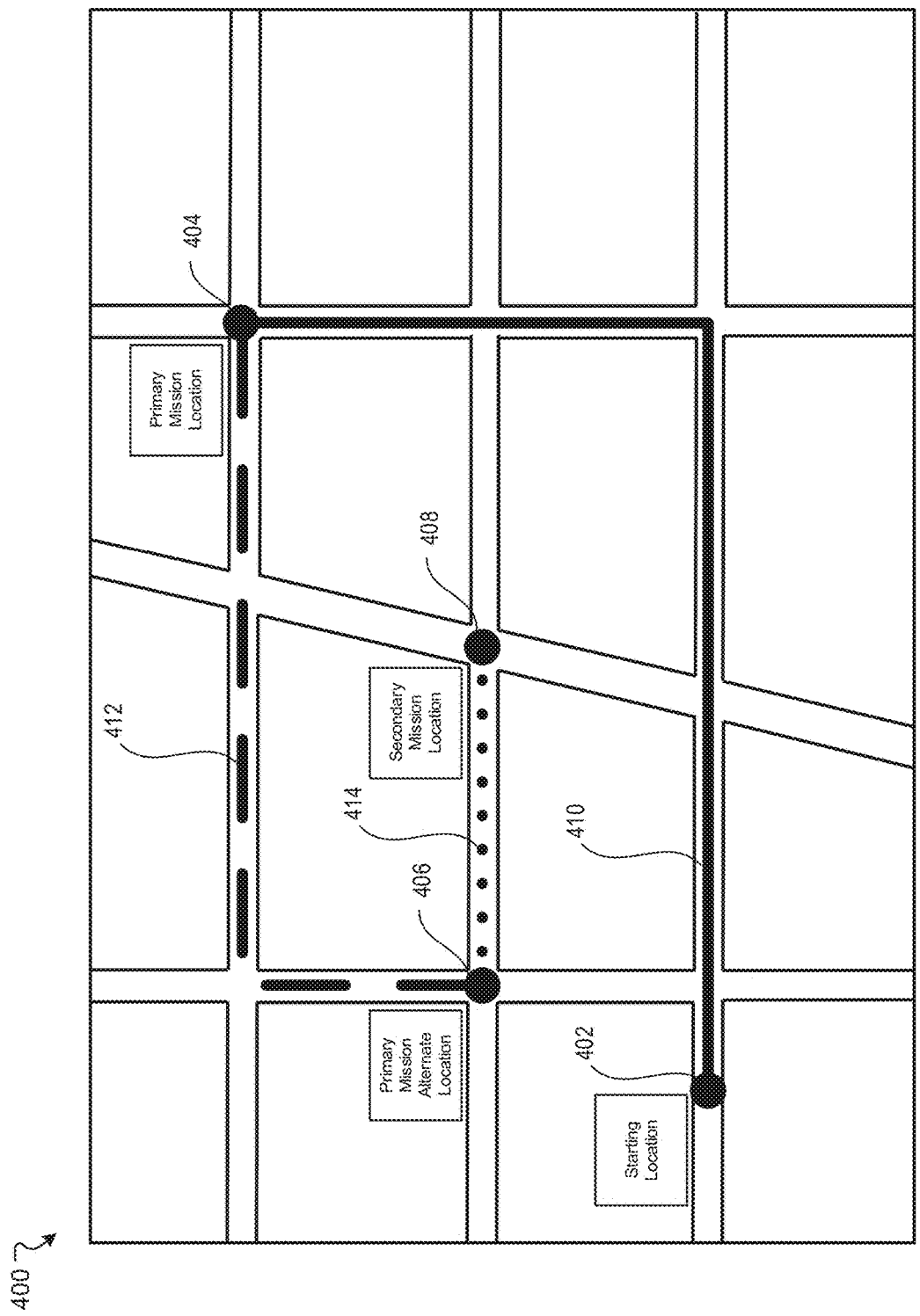
FIG. 4 illustrates an example route associated with a mission, according to an embodiment of the present technology.

FIG. 4 illustrates an example route 400 associated with a mission, according to an embodiment of the present technology. The mission, in this example, can include a primary mission to encounter a primary targeted scenario and a secondary mission to encounter a secondary targeted scenario. In this example, a vehicle starts at a starting location 402 and navigates along a first route 410 to a primary mission location 404. The primary mission location 404 can be a location where it is likely for the vehicle to encounter the primary targeted scenario. The primary mission location 404 can be determined based on a likelihood of encountering the primary targeted scenario, a distance from the starting location 402 to the primary mission location 404, a distance from the primary mission location 404 to a subsequent mission location, a priority associated with the primary targeted scenario, and an associated cost, as described above. In this example, the vehicle fails to encounter the primary targeted scenario at the primary mission location 404. As a result, the vehicle is provided with a second route 412 to a primary mission alternate location 406 where the vehicle can again attempt to encounter the primary targeted scenario. The primary mission alternate location 406 can be determined based on a likelihood of encountering the primary targeted scenario, a distance from the starting location 402 to the primary mission alternate location 406, a distance from the primary mission location 404 to the primary mission alternate location 406, a distance from the primary mission alternate location 406 to a subsequent mission location, a priority associated with the primary targeted scenario, and an associated cost, as described above. In this example, the likelihood of encountering the primary targeted scenario at the primary mission alternate location 406 can be lower than the likelihood of encountering the primary targeted scenario at the primary mission location 404. Based on the higher likelihood of encountering the primary targeted scenario at the primary mission location 404, the distance from the primary mission location 404 to the primary mission alternate location 406 and the secondary mission location 408, and the priority associated with the primary targeted scenario, it may be more efficient to route the vehicle to the primary mission location 404 than other locations, such as the primary mission alternate location 406. Accordingly, even though the primary mission alternate location 406 is closer to the starting location 402, the vehicle is routed to the primary mission location 404 before being routed to the primary mission alternate location 406. In this example, the vehicle successfully encounters the primary targeted scenario at the primary mission alternate location 406. The vehicle is provided with a third route 414 to a secondary mission location 408. The secondary mission location is a location where it is likely for the vehicle to encounter the secondary targeted scenario. Many variations are possible.

Figure 5:
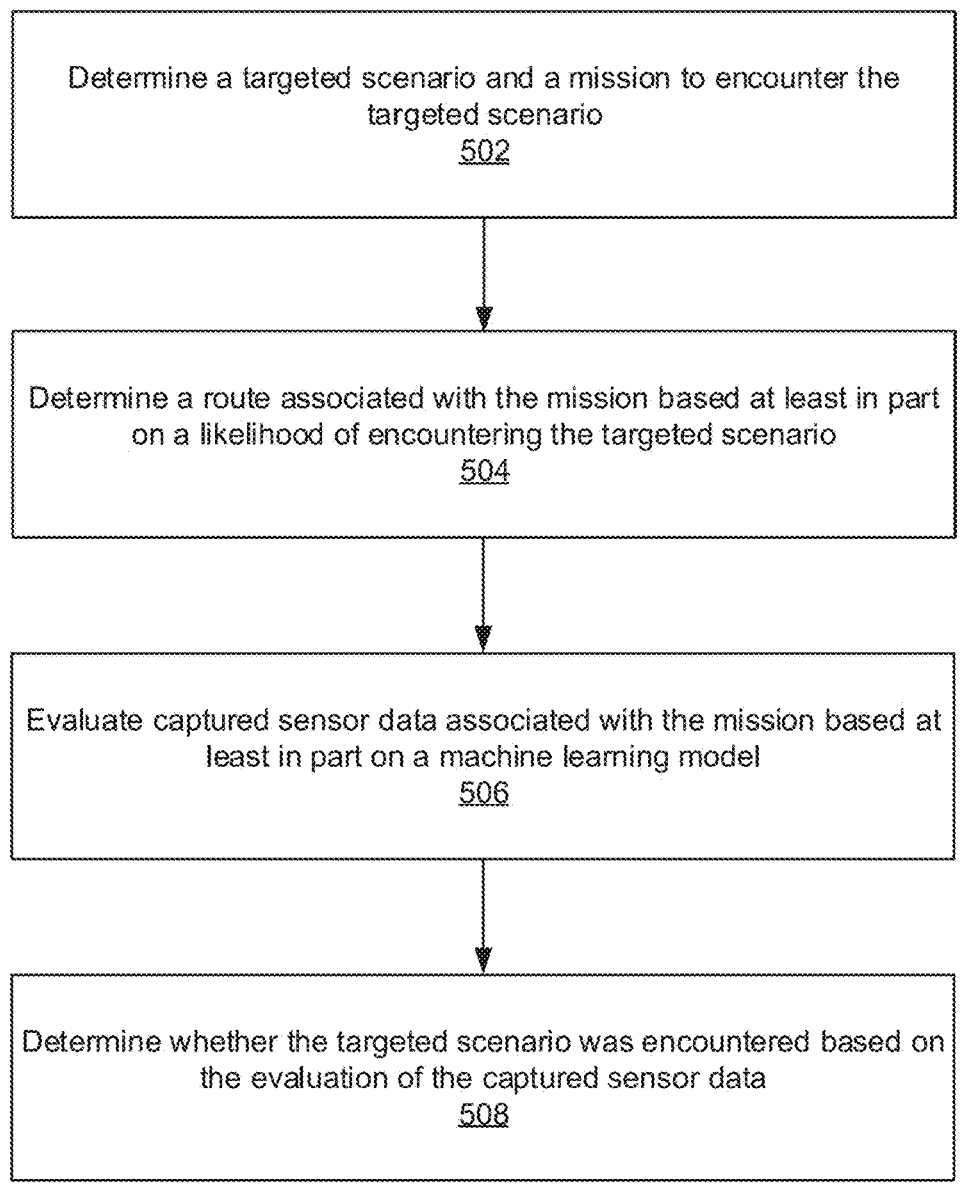
FIG. 5 illustrates an example method, according to an embodiment of the present technology.

FIG. 5 illustrates an example method 500, according to an embodiment of the present technology. At block 502, the example method 500 determines a targeted scenario and a mission to encounter the targeted scenario. At block 504, the example method 500 determines a route associated with the mission based at least in part on a likelihood of encountering the targeted scenario. At block 506, the example method 500 evaluates captured sensor data associated with the mission based at least in part on a machine learning model. At block 508, the example method 500 determines whether the targeted scenario was encountered based on the evaluation of the captured sensor data. Many variations to the example method 500 are possible. It should be appreciated that there can be additional, fewer, or alternative steps performed in similar or alternative orders, or in parallel, within the scope of the various embodiments discussed herein unless otherwise stated.

Figure 6:
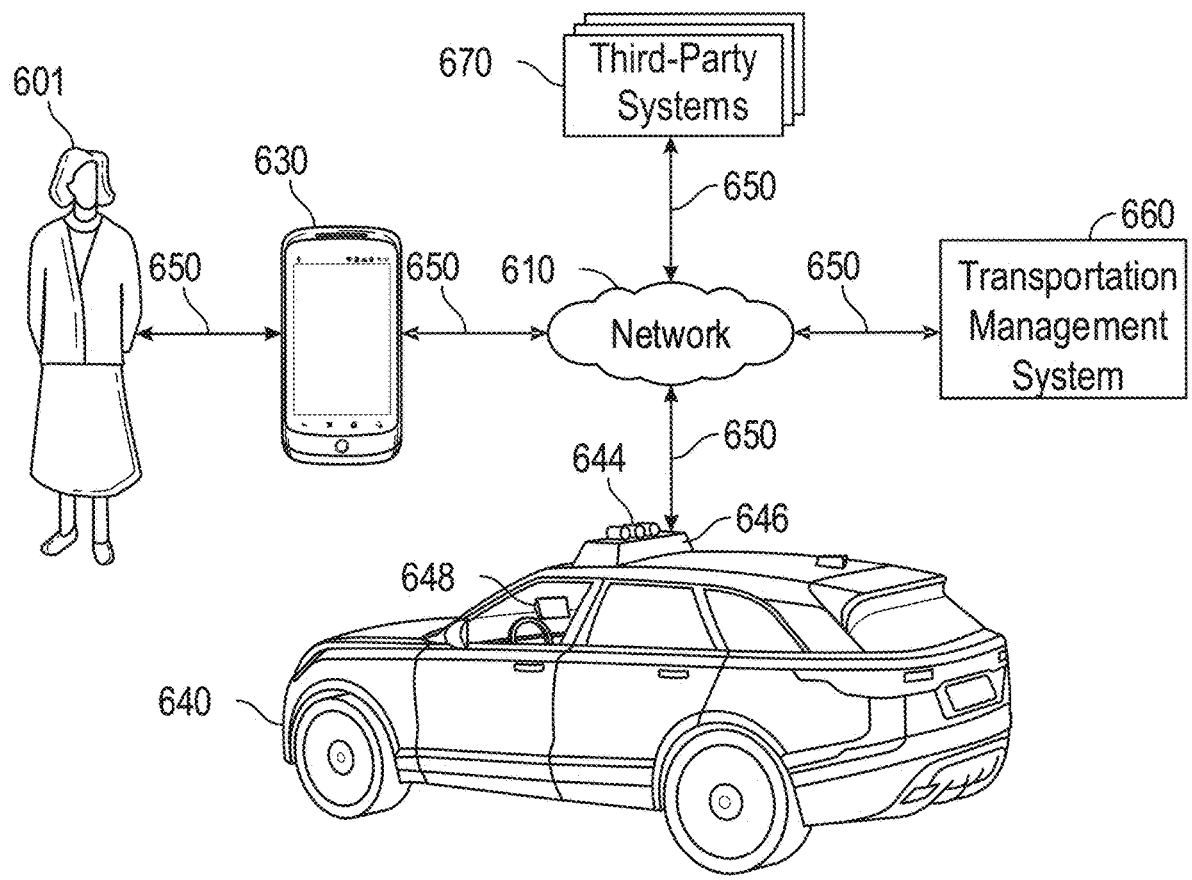
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the smart monitoring module 202 may be implemented by one or more computing systems of the transportation management system 660. In some embodiments, some or all modules of the smart monitoring module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, California, the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data captured by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
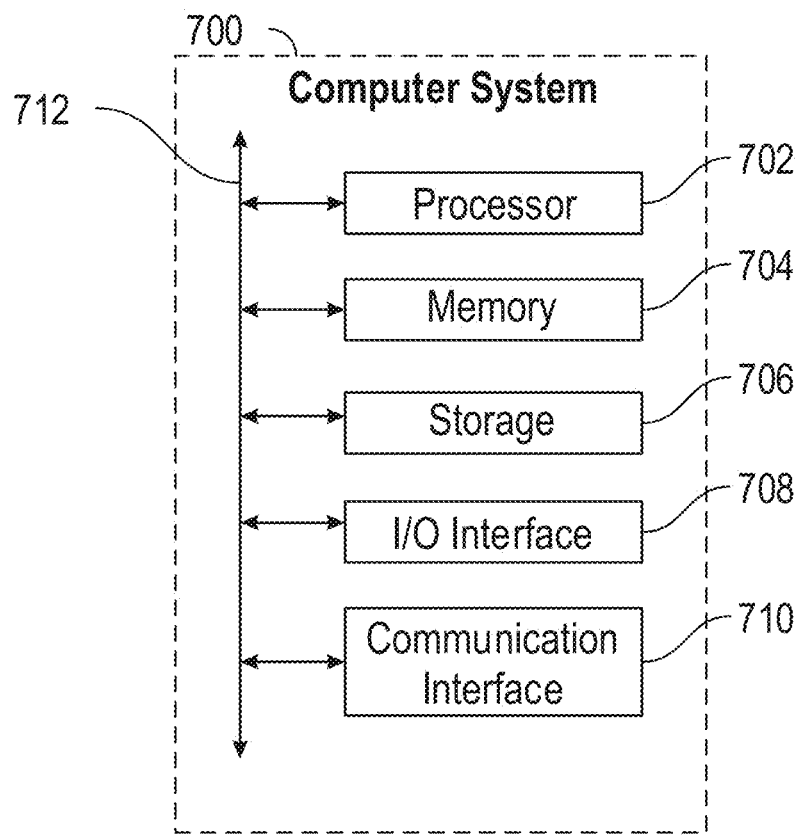
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system, a targeted scenario and a mission to encounter the targeted scenario;
   determining, by the computing system, a route to a location associated with the mission based at least in part on a likelihood of encountering the targeted scenario, wherein the likelihood of encountering the targeted scenario is based at least in part on a history of sensor data captured from the location and a frequency with which one or more scenarios similar to the targeted scenario were encountered at the location; and
   determining, by the computing system, whether the targeted scenario was encountered based on an evaluation of captured sensor data associated with the mission at the location, wherein the captured sensor data is captured by one or more sensors.

2. The computer-implemented method of claim 1, wherein the history of sensor data is associated with scenarios that were encountered at the location and times when the scenarios were encountered.

3. The computer-implemented method of claim 1, wherein the evaluation of the captured sensor data is based at least in part on a machine learning model, and the machine learning model is trained to determine whether a first set of images associated with the captured sensor data corresponds with a second set of images associated with the targeted scenario.

4. The computer-implemented method of claim 1, wherein the evaluation of the captured sensor data is based at least in part on a machine learning model, and the machine learning model is trained to determine whether one or more first objects associated with the captured sensor data correspond with one or more second objects associated with the targeted scenario.

5. The computer-implemented method of claim 1, further comprising:
determining, by the computing system, a new route associated with the mission based at least in part on a determination that the targeted scenario was not encountered.

6. The computer-implemented method of claim 1, wherein the targeted scenario comprises a set of features associated with the targeted scenario and wherein the set of features corresponds with one or more objects associated with the targeted scenario.

7. The computer-implemented method of claim 6, wherein the targeted scenario is based at least in part on a past scenario and the set of features associated with the targeted scenario is based at least in part on sensor data associated with the past scenario.

8. The computer-implemented method of claim 6, wherein the targeted scenario is based at least in part on user specified features to be included in the targeted scenario and the set of features associated with the targeted scenario is based at least in part on sensor data associated with the user specified features.

9. The computer-implemented method of claim 1, wherein the mission to encounter the targeted scenario is one of a set of missions ranked based at least in part on a respective likelihood of encountering a respective targeted scenario.

10. The computer-implemented method of claim 9, wherein the set of missions are ranked further based at least in part on at least one of: a distance, a cost, an availability, or a proximity to other targeted scenarios associated with each respective targeted scenario.

11. A system comprising:
at least one processor; and
a non-transitory computer-readable media storing instructions that, when executed by the at least one processor, cause the system to perform:
determining a targeted scenario and a mission to encounter the targeted scenario;
determining a route to a location associated with the mission based at least in part on a likelihood of encountering the targeted scenario, wherein the likelihood of encountering the targeted scenario is based at least in part on a history of sensor data captured from the location and a frequency with which one or more scenarios similar to the targeted scenario were encountered at the location; and
determining whether the targeted scenario was encountered based on an evaluation of captured sensor data associated with the mission at the location, wherein the captured sensor data is captured by one or more sensors.

12. The system of claim 11, wherein the history of sensor data is associated with scenarios that were encountered at the location and times when the scenarios were encountered.

13. The system of claim 11, wherein the targeted scenario comprises a set of features associated with the targeted scenario and wherein the set of features corresponds with one or more objects associated with the targeted scenario.

14. The system of claim 13, wherein the targeted scenario is based at least in part on a past scenario and the set of features associated with the targeted scenario is based at least in part on sensor data associated with the past scenario.

15. The system of claim 13, wherein the targeted scenario is based at least in part on user specified features to be included in the targeted scenario and the set of features associated with the targeted scenario is based at least in part on sensor data associated with the user specified features.

16. A non-transitory computer-readable storage medium including instructions that, when executed by at least one processor of a computing system, cause the computing system to perform a method comprising:
determining a targeted scenario and a mission to encounter the targeted scenario;
determining a route to a location associated with the mission based at least in part on a likelihood of encountering the targeted scenario, wherein the likelihood of encountering the targeted scenario is based at least in part on a history of sensor data captured from the location and a frequency with which one or more scenarios similar to the targeted scenario were encountered at the location; and
determining whether the targeted scenario was encountered based on an evaluation of captured sensor data associated with the mission at the location, wherein the captured sensor data is captured by one or more sensors.

17. The non-transitory computer-readable storage medium of claim 16, wherein the history of sensor data is associated with scenarios that were encountered at the location and times when the scenarios were encountered.

18. The non-transitory computer-readable storage medium of claim 16, wherein the targeted scenario comprises a set of features associated with the targeted scenario and wherein the set of features corresponds with one or more objects associated with the targeted scenario.

19. The non-transitory computer-readable storage medium of claim 18, wherein the targeted scenario is based at least in part on a past scenario and the set of features associated with the targeted scenario is based at least in part on sensor data associated with the past scenario.

20. The non-transitory computer-readable storage medium of claim 18, wherein the targeted scenario is based at least in part on user specified features to be included in the targeted scenario and the set of features associated with the targeted scenario is based at least in part on sensor data associated with the user specified features.

* * * * *